US012028731B2

(12) United States Patent
Zhou et al.

(10) Patent No.: US 12,028,731 B2
(45) Date of Patent: Jul. 2, 2024

(54) TECHNIQUES IN SYSTEM FRAME NUMBER (SFN) AND FRAME TIMING DIFFERENCE MEASUREMENTS IN NEW RADIO (NR)

(71) Applicant: Apple Inc., Cupertino, CA (US)

(72) Inventors: Yuhan Zhou, San Jose, CA (US); Jie Cui, Santa Clara, CA (US); Yang Tang, San Jose, CA (US); Hua Li, Beijing (CN); Rui Huang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/450,715

(22) Filed: Jun. 24, 2019

(65) Prior Publication Data

US 2019/0313272 A1     Oct. 10, 2019

Related U.S. Application Data

(60) Provisional application No. 62/689,709, filed on Jun. 25, 2018.

(51) Int. Cl.
*H04W 24/10* (2009.01)
*H04W 56/00* (2009.01)
*H04W 88/06* (2009.01)

(52) U.S. Cl.
CPC ....... *H04W 24/10* (2013.01); *H04W 56/0065* (2013.01); *H04W 88/06* (2013.01)

(58) Field of Classification Search
CPC .. H04W 24/10; H04W 56/0065; H04W 88/06
See application file for complete search history.

(56) References Cited

U.S. PATENT DOCUMENTS

| 9,408,122 B2* | 8/2016 | Tsai | ............ H04W 36/08 |
| 9,544,932 B2* | 1/2017 | Lee | ............ H04W 56/004 |
| 10,609,611 B2* | 3/2020 | Park | ............ H04W 76/27 |

(Continued)

FOREIGN PATENT DOCUMENTS

| EP | 3188534 A1 * | 7/2017 | ............ H04W 24/10 |
| WO | WO-2017196246 A2 * | 11/2017 | ............ H04L 5/1469 |
| WO | WO-2019160266 A1 * | 8/2019 | ............ H04L 5/001 |

OTHER PUBLICATIONS

3GPP, "Technical Specification Group Radio Access Network; Evolved Universal Terrestrial Radio Access (E-UTRA); Requirements for support of radio resource management (Release 15)," 3GPP TS 36.133 V15.2.0 (Mar. 2018), 5G, 3,027 pages.

(Continued)

*Primary Examiner* — Derrick W Ferris
*Assistant Examiner* — Chuong M Nguyen
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for configuration of System frame number (SFN) and Frame Timing Difference (SFTD) measurement in an E-UTRA (Evolved Universal Terrestrial Radio Access)—NR Dual Connectivity (EN-DC) network, and an NE-DC network. Various embodiments describe how to configure and perform the SFTD measurement in the EN-DC or NE-DC network of various conditions to facilitate adequate SFTD measurements and improve measurement accuracy and system performance. Other embodiments may be described and claimed.

23 Claims, 8 Drawing Sheets

(56) References Cited

U.S. PATENT DOCUMENTS

| | | | |
|---|---|---|---|
| 11,206,563 B2* | 12/2021 | Tsai | H04W 24/10 |
| 2013/0148530 A1* | 6/2013 | Di Girolamo | H04W 36/0088 |
| | | | 370/252 |
| 2013/0260793 A1* | 10/2013 | Lim | H04W 4/02 |
| | | | 455/456.1 |
| 2014/0302865 A1* | 10/2014 | Bai | H04W 24/10 |
| | | | 455/452.1 |
| 2015/0312789 A1* | 10/2015 | You | H04W 24/10 |
| | | | 370/252 |
| 2016/0056939 A1* | 2/2016 | Kim | H04W 24/10 |
| | | | 370/331 |
| 2017/0331577 A1* | 11/2017 | Parkvall | H04L 5/1469 |
| 2018/0288654 A1* | 10/2018 | Shih | H04W 48/14 |
| 2019/0053235 A1* | 2/2019 | Novlan | H04L 7/0008 |
| 2019/0215711 A1* | 7/2019 | Tsai | H04W 24/10 |
| 2019/0380172 A1* | 12/2019 | Xu | H04W 76/15 |
| 2020/0389929 A1* | 12/2020 | Harada | H04W 36/0069 |
| 2020/0413358 A1* | 12/2020 | Harada | H04W 56/001 |
| 2021/0105646 A1* | 4/2021 | Siomina | H04W 24/08 |

OTHER PUBLICATIONS

3GPP, "Technical Specification Group Radio Access Network; NR; Requirements for support of radio resource management (Release 15)," 3GPP TS 38.133 V15.1.0 (Mar. 2018), 5G, 59 pages.

* cited by examiner

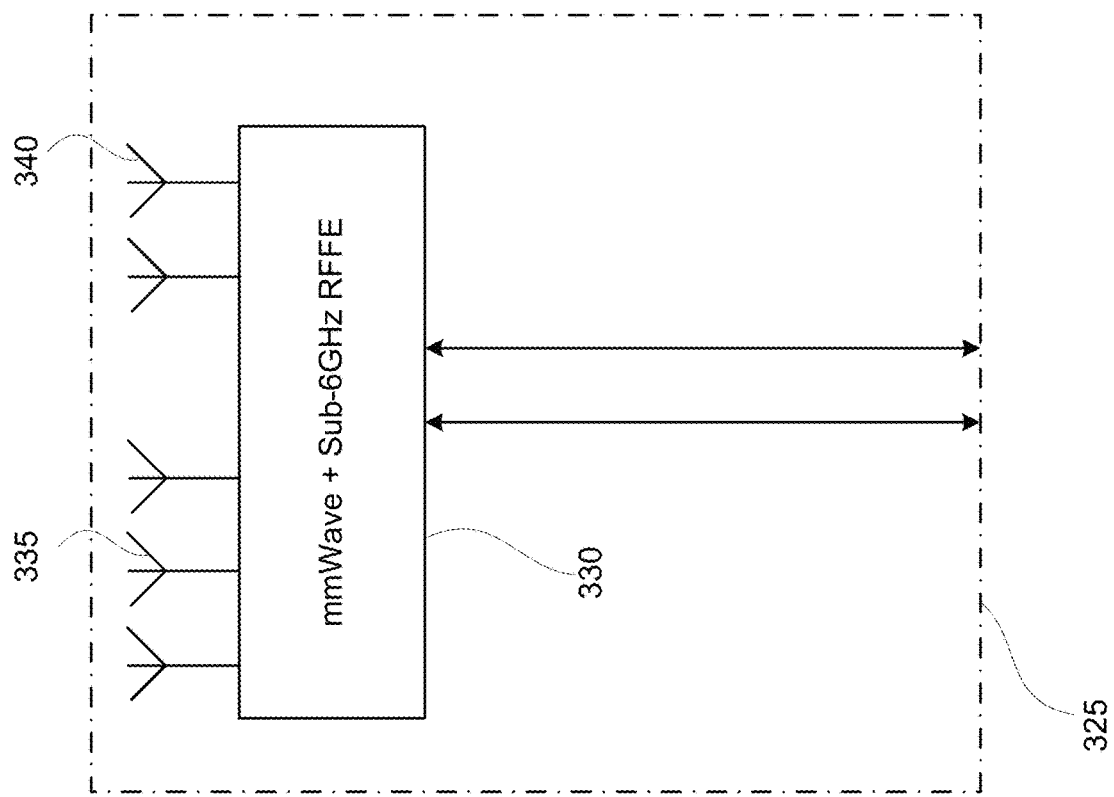
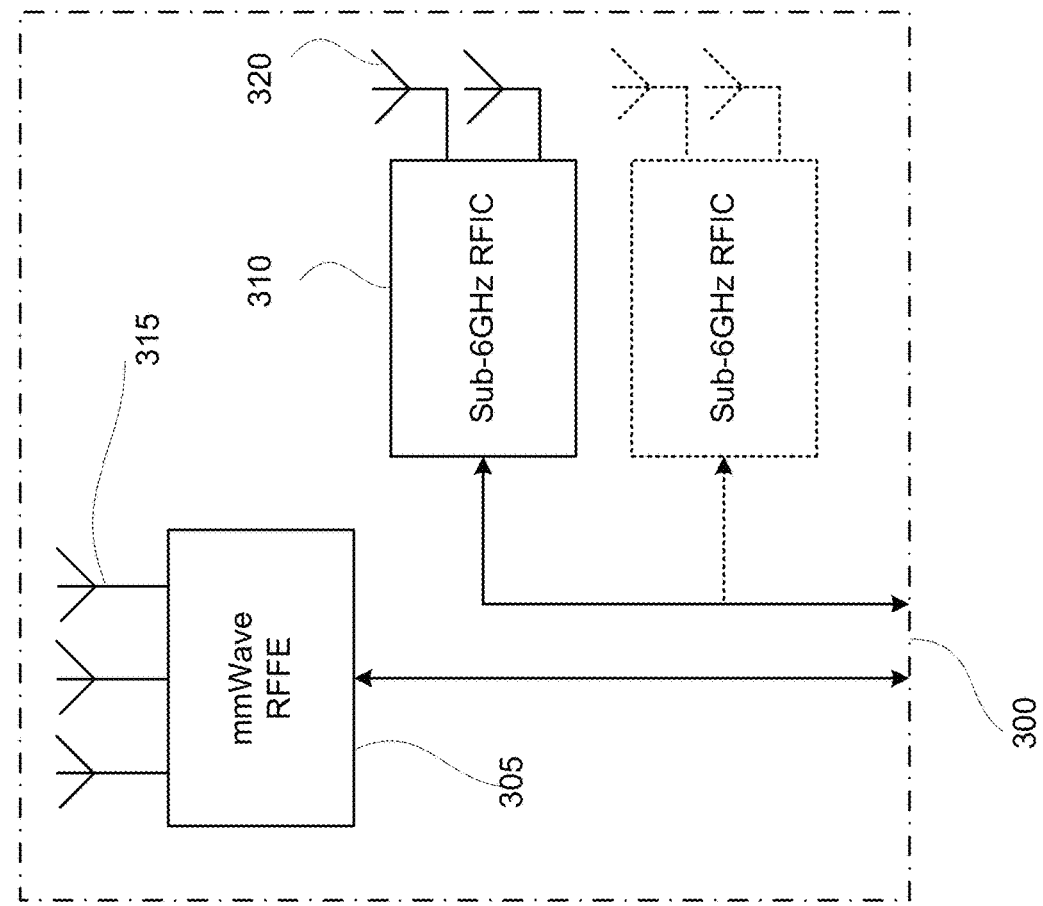
Figure 3B
Figure 3A

TECHNIQUES IN SYSTEM FRAME NUMBER (SFN) AND FRAME TIMING DIFFERENCE MEASUREMENTS IN NEW RADIO (NR)

CROSS REFERENCE TO RELATED APPLICATION

The present application claims priority to U.S. Provisional Patent Application No. 62/689,709, filed Jun. 25, 2018, entitled "SFTD Measurement for EN-DC and NE-DC," the entire disclosure of which is hereby incorporated by reference in its entirety.

FIELD

Embodiments of the present invention relate generally to the technical field of wireless communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

The initial Fifth Generation (5G) New Radio (NR) is implemented in Non-Standalone (NSA) networks that incorporate both Long Term Evolution (LTE) and NR, for example, E-UTRA (Evolved Universal Terrestrial Radio Access)—NR Dual Connectivity (EN-DC) networks, and NE-DC networks. In an EN-DC or NE-DC network, the 5G NR may be supported by or interacted with existing Fourth Generation (4G) infrastructures and frameworks. For example, an NR-enabled user equipment (UE) may use 5G NR for data-throughput improvements but still use 4G for non-data duties such as neighbor-cell search and measurements. In an EN-DC or NE-DC network, the existing technologies may not be feasible in handling certain non-data duties, e.g., detecting or measuring neighbor cells. New solutions are needed in this regard.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 3A illustrates an example radio frequency front end (RFFE) incorporating a millimeter Wave (mmWave) RFFE and one or more sub-millimeter wave radio frequency integrated circuits (RFICs) in accordance with some embodiments. FIG. 3B illustrates an alternative RFFE in accordance with some embodiments.

DETAILED DESCRIPTION

Figure 1:
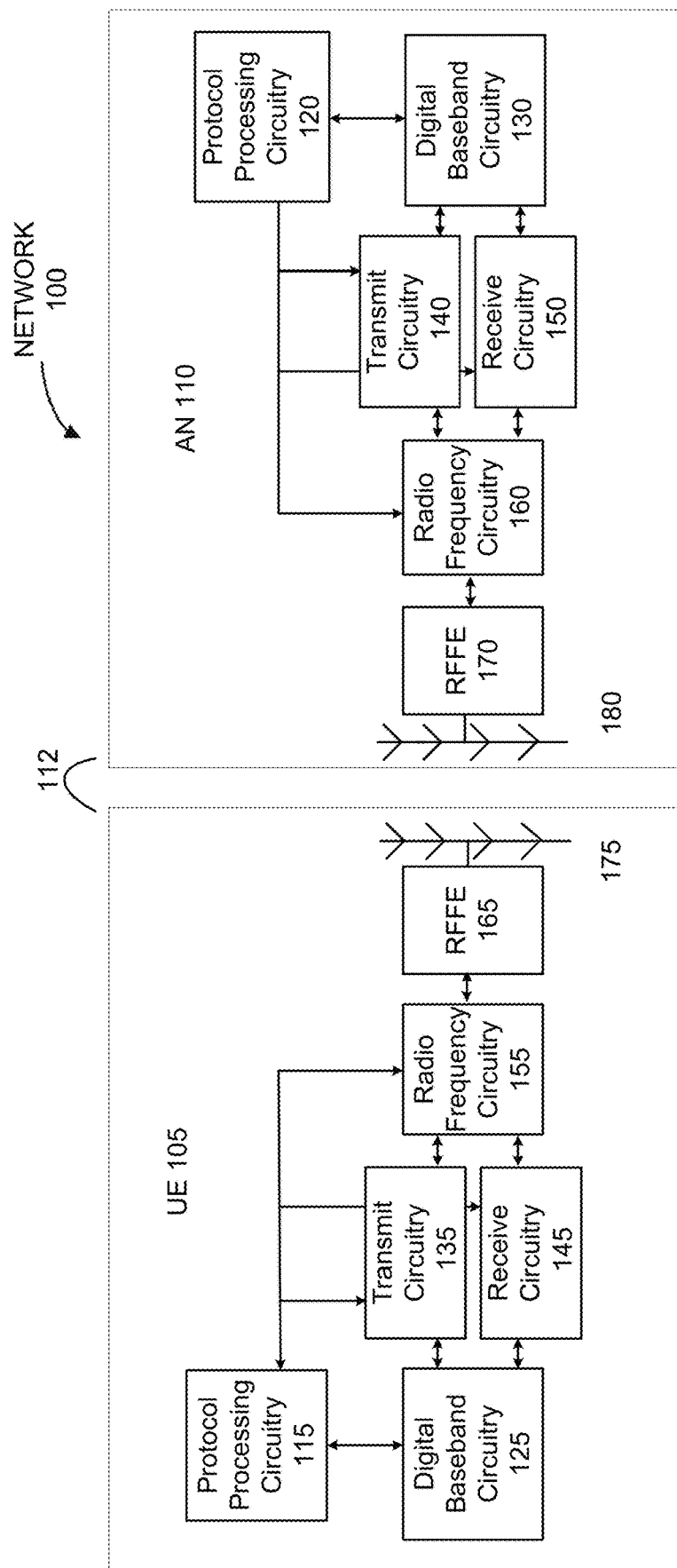
FIG. 1 schematically illustrates an example of a network comprising a user equipment (UE) and an access node (AN) in a wireless network, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

There are various bands below 6 GHz in 4G LTE networks. In NR, frequency range 1 (FR1) overlaps and extends 4G LTE frequencies, including various bands from 450 MHz to 6,000 MHz, which is commonly referred to as NR sub-6GHz. NR further includes a frequency range 2 (FR2) covering from 24,250 MHz to 52,600 MHz, which is commonly referred to as mmWave, even though the millimeter wave frequency may start at 30 GHz strictly speaking.

Herein, the pairs of FR1/FR2 and sub-6GHz (below 6 GHz)/mmWave are used interchangeably.

Multi-Radio Access Technology (RAT) Dual Connectivity (MR-DC) may involve a multiple reception (Rx)/transmission (Tx) UE that may be configured to utilize radio resources provided by two distinct schedulers in two different nodes connected via non-ideal backhaul, one providing Evolved Universal Terrestrial Radio Access (E-UTRA) access and the other one providing NR access. One scheduler is located in a Master Node (MN) and the other in the Secondary Node (SN). The MN and SN are connected via a network interface and at least the MN is connected to the core network.

MR-DC may include, but is not limited to, E-UTRA—NR Dual Connectivity (EN-DC), NG-RAN—E-UTRA-NR Dual Connectivity (NGEN-DC), and NR—E-UTRA Dual Connectivity (NE-DC). In an EN-DC network or communication, a UE may be connected to one evolved NodeB (eNB) or ng-eNB that acts as an MN and one next generation NodeB (gNB) that acts as an SN. The eNB or ng-eNB is connected to an evolved packet core (EPC) and the gNB is connected to the eNB. The gNB may be a node that provides new radio (NR) user-plane and control-plane protocol terminations towards the UE, and acts as the SN in EN-DC. In an EN-DC network or communication, by contrast, a UE may be connected to one gNB that acts as an MN and one eNB or ng-eNB that acts as an SN. The gNB is connected to 5G Core (5GC) and the eNB or ng-eNB is connected to the gNB via the Xn interface.

In an EN-DC or NE-DC network of multiple cells, including both serving cells and non-serving cells, a UE may be required to measure or detect a non-serving neighbor cell, the eNB or gNB in serving cell may not have information regarding the neighbor cell detection. The UE may be configured to perform one or more System Frame Number (SFN) and Frame Timing Difference (SFTD) measurements with respect to one or more neighboring cells in the network. The SFN refers to system frame number, which is used to number a frame and runs repeatedly from 0 to 1023 in LTE communications. In the SFTD measurement, a UE may measure the timing difference of SFN and frame boundary between the serving cell and one or more NR neighbor cells being measured and report the results to the corresponding base station of the serving cell.

Embodiments described herein may include, for example, apparatuses, methods, and storage media for configuring and implementing SFTD measurements in, or related to, EN-DC and NE-DC networks from perspectives of both UEs and networks. Various embodiments are directed to adequate configuration regarding SFTD measurements in the network. Such configurations may facilitate adequate SFTD measurements and improve measurement accuracy and system performance.

FIG. 1 schematically illustrates an example wireless network 100 (hereinafter "network 100") in accordance with various embodiments herein. The network 100 may include a UE 105 in wireless communication with an AN 110. The UE 105 may be configured to connect, for example, to be communicatively coupled, with the AN 110. In this example, the connection 112 is illustrated as an air interface to enable communicative coupling, and can be consistent with cellular communications protocols such as a 5G NR protocol operating at mmWave and sub-6GHz, a Global System for Mobile Communications (GSM) protocol, a code-division multiple access (CDMA) network protocol, a Push-to-Talk (PTT) protocol, and the like.

The UE 105 is illustrated as a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, customer premises equipment (CPE), fixed wireless access (FWA) device, vehicle mounted UE or any computing device including a wireless communications interface. In some embodiments, the UE 105 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The AN 110 can enable or terminate the connection 112. The AN 110 can be referred to as a base station (BS), NodeB, evolved-NodeB (eNB), next-generation eNB (ng-eNB), next-generation NodeB (gNB or ng-gNB), NG-RAN node, cell, serving cell, neighbor cell, primary cell (PCell), secondary cell (SCell), primary SCell (PSCell), and so forth, and can comprise ground stations (for example, terrestrial access points) or satellite stations providing coverage within a geographic area.

The AN 110 can be the first point of contact for the UE 105. In some embodiments, the AN 110 can fulfill various logical functions including, but not limited to, radio network controller (RNC) functions such as radio bearer management, uplink and downlink dynamic radio resource management and data packet scheduling, and mobility management.

In some embodiments, a downlink resource grid can be used for downlink transmissions from the AN 110 to the UE 105, while uplink transmissions can utilize similar techniques. The grid can be a time-frequency grid, called a resource grid or time-frequency resource grid, which is the physical resource in the downlink in each slot. Such a time-frequency plane representation is a common practice for orthogonal frequency division multiplexing (OFDM) systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 105. The physical downlink control channel (PDCCH) may carry information about the transport format and resource allocations related to the PDSCH channel, among other things. It may also inform the UE 105 about the transport format, resource allocation, and hybrid automatic repeat request (HARD) information related to the uplink shared channel. Typically, downlink scheduling (assigning control and shared channel resource blocks to the UE 105 within a cell) may be performed at the AN 110 based on channel quality information fed back from any of the UE 105. The downlink resource assignment information may be sent on the PDCCH used for (for example, assigned to) the UE 105.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition.

Some embodiments may use concepts for resource allocation for control channel information that are an extension of the above-described concepts. For example, some embodiments may utilize an enhanced physical downlink control channel (ePDCCH) that uses PDSCH resources for control information transmission. The ePDCCH may be transmitted using one or more enhanced control channel elements (ECCEs). Similar to the above, each ECCE may correspond to nine sets of four physical resource elements known as enhanced resource element groups (EREGs). An ECCE may have other numbers of EREGs in some situations.

As shown in FIG. 1, the UE 105 may include millimeter wave communication circuitry grouped according to functions. The circuitry shown here is for illustrative purposes and the UE 105 may include other circuitry shown in FIGS. 3A and 3B. The UE 105 may include protocol processing circuitry 115, which may implement one or more layer operations related to medium access control (MAC), radio link control (RLC), packet data convergence protocol (PDCP), radio resource control (RRC) and non-access stratum (NAS). The protocol processing circuitry 115 may include one or more processing cores (not shown) to execute instructions and one or more memory structures (not shown) to store program and data information.

The UE 105 may further include digital baseband circuitry 125, which may implement physical layer (PHY) functions including one or more of HARQ functions, scrambling and/or descrambling, coding and/or decoding, layer mapping and/or de-mapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions.

The UE 105 may further include transmit circuitry 135, receive circuitry 145, radio frequency (RF) circuitry 155, and RF front end (RFFE) 165, which may include or connect to one or more antenna panels 175.

In some embodiments, RF circuitry 155 may include multiple parallel RF chains or branches for one or more of transmit or receive functions; each chain or branch may be coupled with one antenna panel 175.

In some embodiments, the protocol processing circuitry 115 may include one or more instances of control circuitry (not shown) to provide control functions for the digital baseband circuitry 125 (or simply, "baseband circuitry 125"), transmit circuitry 135, receive circuitry 145, radio frequency circuitry 155, RFFE 165, and one or more antenna panels 175.

Figure 2:
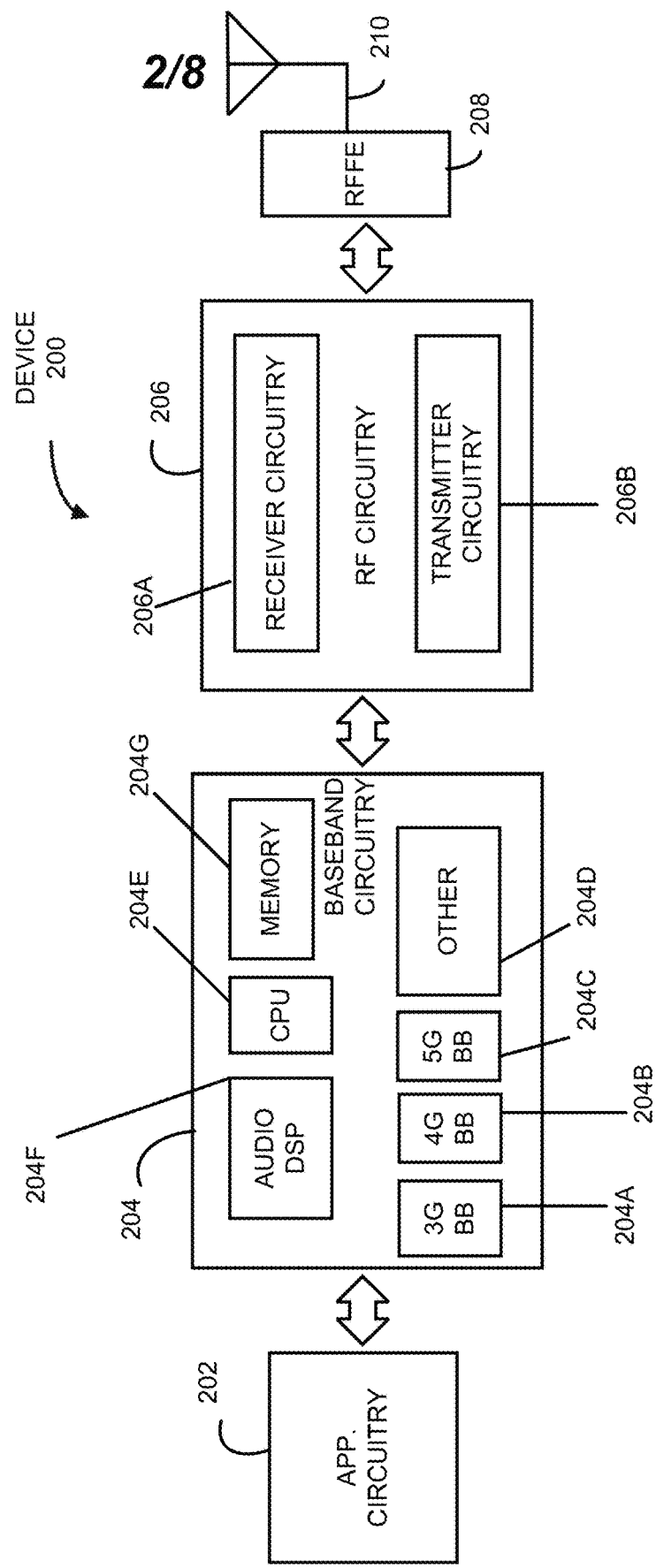
FIG. 2 illustrates example components of a device in accordance with various embodiments.

A UE reception may be established by and via the one or more antenna panels 175, RFFE 165, RF circuitry 155, receive circuitry 145, digital baseband circuitry 125, and protocol processing circuitry 115. The one or more antenna panels 175 may receive a transmission from the AN 110 by receive-beamforming signals received by a plurality of antennas/antenna elements of the one or more antenna panels 175. Further details regarding the UE 105 architecture are illustrated in FIGS. 2, 3A/3B, and 6. The transmission from the AN 110 may be transmit-beamformed by antennas of the AN 110. In some embodiments, the baseband circuitry 125 may contain both the transmit circuitry 135 and the receive circuitry 145. In other embodiments, the baseband circuitry 125 may be implemented in separate chips or modules, for example, one chip including the transmit circuitry 135 and another chip including the receive circuitry 145.

Similar to the UE 105, the AN 110 may include mmWave/sub-mmWave communication circuitry grouped according to functions. The AN 110 may include protocol processing circuitry 120, digital baseband circuitry 130 (or simply, "baseband circuitry 130"), transmit circuitry 140, receive circuitry 150, RF circuitry 160, RFFE 170, and one or more antenna panels 180.

A cell transmission may be established by and via the protocol processing circuitry 120, digital baseband circuitry 130, transmit circuitry 140, RF circuitry 160, RFFE 170, and one or more antenna panels 180. The one or more antenna panels 180 may transmit a signal by forming a transmit beam. FIG. 3 further illustrates details regarding the RFFE 170 and antenna panel 180.

FIG. 2 illustrates example components of a device 200 in accordance with some embodiments. In contrast to FIG. 1, FIG. 2 illustrates example components of the UE 105 or the AN 110 from a receiving and/or transmitting function point of view, and it may not include all of the components described in FIG. 1. In some embodiments, the device 200 may include application circuitry 202, baseband circuitry 204, RF circuitry 206, RFFE circuitry 208, and a plurality of antennas 210 together at least as shown. The baseband circuitry 204 may be similar to and substantially interchangeable with the baseband circuitry 125 in some embodiments. The plurality of antennas 210 may constitute one or more antenna panels for beamforming. The components of the illustrated device 200 may be included in a UE or an AN. In some embodiments, the device 200 may include fewer elements (for example, a cell may not utilize the application circuitry 202, and instead include a processor/controller to process IP data received from an EPC). In some embodiments, the device 200 may include additional elements such as, for example, a memory/storage, display, camera, sensor, or input/output (I/O) interface. In other embodiments, the components described below may be included in more than one device (for example, said circuitry may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (for example, graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may be similar to and substantially interchangeable with the baseband circuitry 125 and the baseband circuitry 130 in some embodiments. The baseband circuitry 204 may include one or more baseband processors or control logic to process baseband signals received from a receive signal path of the RF circuitry 206 and to generate baseband signals for a transmit signal path of the RF circuitry 206. Baseband circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (for example, second generation (2G), sixth generation (6G), etc.). The baseband circuitry 204 (for example, one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a central processing unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may include elements for compression/decompression and echo cancellation and may include other suitable processing elements in other embodiments. Components of the baseband circuitry may be suitably combined in a single chip, in a single chipset, or disposed on a same circuit board in some embodiments. In some embodiments, some or all of the constituent components of the baseband circuitry 204 and the application circuitry 202 may be implemented together such as, for example, on a SOC.

In some embodiments, the baseband circuitry 204 may provide for communication compatible with one or more radio technologies. For example, in some embodiments, the baseband circuitry 204 may support communication with an evolved universal terrestrial radio access network (E-UTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include one or more switches, filters, amplifiers, etc. to facilitate the communication with the wireless network. RF circuitry 206 may include receiver circuitry 206A, which may include circuitry to down-convert RF signals received from the RFFE circuitry 208 and provide baseband signals to the baseband circuitry 204. RF circuitry 206 may also include transmitter circuitry 206B, which may include circuitry to up-convert baseband signals provided by the baseband circuitry 204 and provide RF output signals to the RFFE circuitry 208 for transmission.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio integrated circuit (IC) circuitry may be provided for processing signals for each spectrum, although the scope of the embodiments is not limited in this respect.

RFFE circuitry 208 may include a receive signal path, which may include circuitry configured to operate on RF beams received from one or more antennas 210. The RF beams may be transmit beams formed and transmitted by the AN 110 while operating in mmWave or sub-mmWave frequency rang. The RFFE circuitry 208 coupled with the one or more antennas 210 may receive the transmit beams and proceed them to the RF circuitry 206 for further processing. RFFE circuitry 208 may also include a transmit signal path, which may include circuitry configured to amplify signals for transmission provided by the RF circuitry 206 for transmission by one or more of the antennas 210, with or without beamforming. In various embodiments, the amplification through transmit or receive signal paths may be done solely in the RF circuitry 206, solely in the RFFE circuitry 208, or in both the RF circuitry 206 and the RFFE circuitry 208.

In some embodiments, the RFFE circuitry 208 may include a TX/RX switch to switch between transmit mode and receive mode operation. The RFFE circuitry 208 may include a receive signal path and a transmit signal path. The receive signal path of the RFFE circuitry 208 may include a low noise amplifier (LNA) to amplify received RF beams and provide the amplified received RF signals as an output (for example, to the RF circuitry 206). The transmit signal path of the RFFE circuitry 208 may include a power amplifier (PA) to amplify input RF signals (for example, provided by RF circuitry 206), and one or more filters to generate RF signals for beamforming and subsequent transmission (for example, by one or more of the one or more antennas 210).

Processors of the application circuitry 202 and processors of the baseband circuitry 204 may be used to execute elements of one or more instances of a protocol stack. For example, processors of the baseband circuitry 204, alone or in combination, may be used to execute Layer 3, Layer 2, or Layer 1 functionality, while processors of the application circuitry 202 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/AN, described in further detail below.

FIG. 3A illustrates an embodiment of a radio frequency front end 300 incorporating an mmWave RFFE 305 and one or more sub-6GHz radio frequency integrated circuits (RFICs) 310. The mmWave RFFE 305 may be similar to and substantially interchangeable with the RFFE 165, RFFE 170, and/or the RFFE circuitry 208 in some embodiments. The mmWave RFFE 305 may be used for the UE 105 while operating in FR2 or mmWave; the RFICs 310 may be used for the UE 105 while operating in FR1, sub-6GHz, or LTE bands. In this embodiment, the one or more RFICs 310 may be physically separated from the mmWave RFFE 305. RFICs 310 may include connection to one or more antennas 320. The RFFE 305 may be coupled with multiple antennas 315, which may constitute one or more antenna panels.

FIG. 3B illustrates an alternate embodiment of an RFFE 325. In this aspect both millimeter wave and sub-6GHz radio functions may be implemented in the same physical RFFE 330. The RFFE 330 may incorporate both millimeter wave antennas 335 and sub-6GHz antennas 340. The RFFE 330 may be similar to and substantially interchangeable with the RFFE 165, RFFE 170, and/or the RFFE circuitry 208 in some embodiments.

FIGS. 3A and 3B illustrate embodiments of various RFFE architectures for either the UE 105 or the AN 110.

In NR-involved communications, an AN associated with a cell may utilize beamforming techniques to form transmit beams when transmitting signals to facilitate directional transmission to a UE at a particular location. This may be especially useful when operating at mmWave frequencies. The transmit beams with respect to a cell with certain direction may provide the UE of a particular location with a stronger signal than other UEs of other locations. This may enable a better wireless connection between the UE and the AN associated with the cell. Multiple transmit beams from a cell may be formed by an antenna panel of the AN associated with the cell. For example, a maximum of 64 transmit beams may be formed with different transmit-beam configurations from a cell. Such transmit-beam configurations may utilize beamforming technology implemented by one or more antenna panels 180. Then, the transmit beams may be received and measured by the UE. In some embodiments, the UE may further form one or more receive beams while receiving. Thus, non-data measurements for cell searching and measurements are beam-dependent.

Figure 4A:
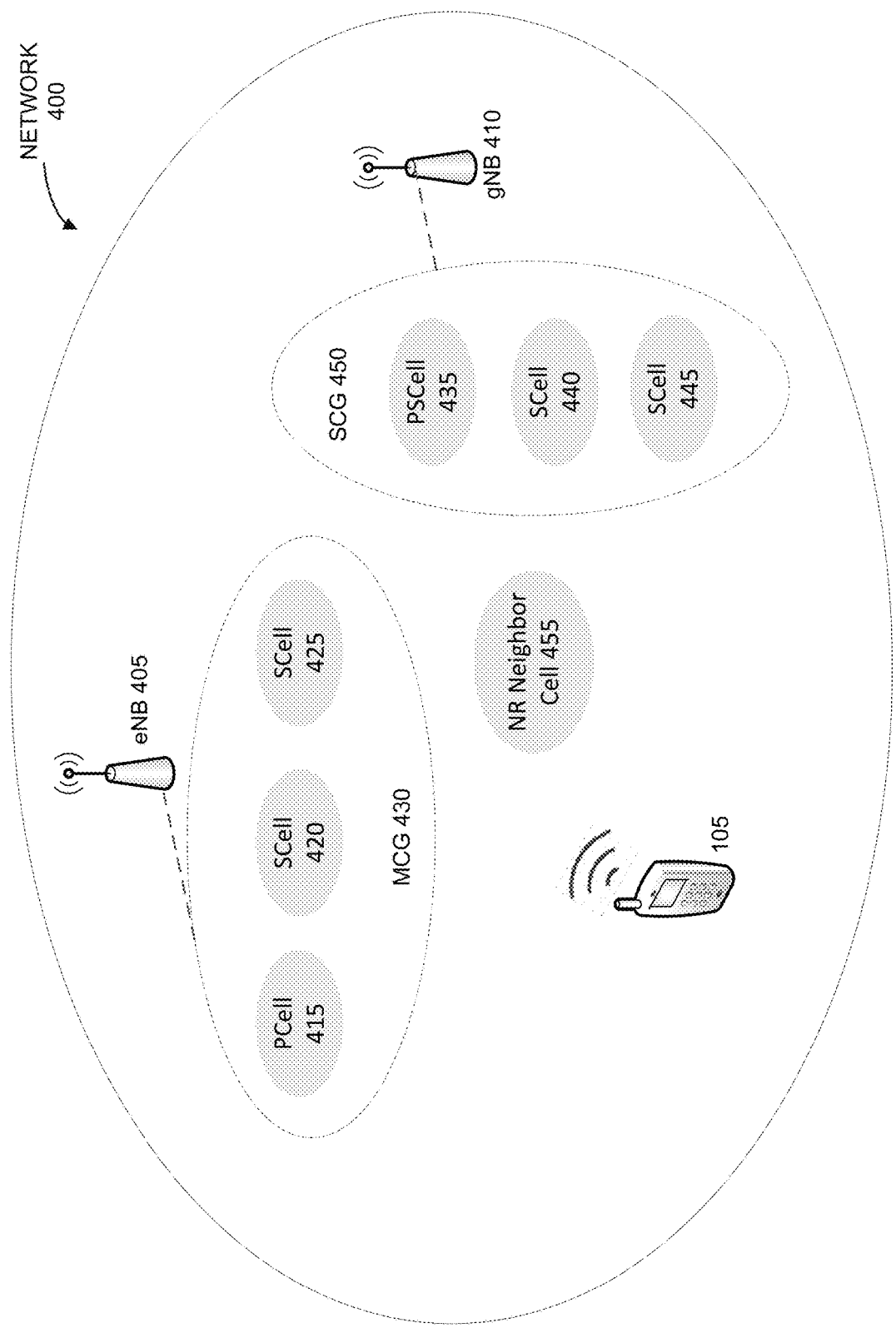
FIGS. 4A and 4B illustrate respective example System frame number (SFN) and Frame Timing Difference (SFTD) measurement configuration and operation in EN-DC and NE-DC networks, according to various embodiments in accordance with various embodiments.

FIG. 4A illustrates respective example network 400 that provides radio access network of 5G NR, according to various embodiments. The network 400 may be an EN-DC network. The network 400 may include multiple ANs, for example, ANs 405 and 410. The ANs 405 and 410 may be the same or substantially similar to the AN 110 in FIG. 1. The AN 405 may provide or be associated with a Primary Serving Cell (PCell) 415 of the UE 105, with which the UE 105 may either performs the initial connection establishment procedure or initiate the connection re-establishment procedure. The AN 410 may provide or be associated with one or more Secondary Cells (SCells).

In some embodiments, the AN 405 may further provide or be associated with one or more Secondary Cells (SCells), e.g., 420 and 425, of the UE 105. The PCell 415 and SCells 420/425 may be part of a Master Cell Group (MCG) 430.

In some embodiments, the one or more SCells may include a Primary Secondary Cell (PSCell) 435 and one or more SCells, e.g., 440 and 445. The PSCell 435 and SCells 440/445 may be part of a Secondary Cell Group (SCG) 450.

Note that "AN of the PCell," "AN in the PCell," and "PCell" are used interchangeably throughout the disclosure herein, as well as regarding the terms of PSCell, SCell, etc.

In a network that operates either in an EN-DC or NE-DC mode to the UE 105, the UE 105 may be required to detect or measure one or more neighboring non-serving cells or some other measurements, upon configurations from the PCell 415. However, the PCell 415 may not be able to configure relevant measurement information for the UE 105, such as corresponding SSB-based Measurement Timing Configuration (SMTC) window and measurement gap. The SMTC window and measurement gap may be set based on the timing of Synchronization Signal Block (SSB) transmission for the cell being measured. But the PCell 415 may not be able to acquire the timing information of SSB transmission from the target cell, due to different technologies or other lack of connections. The PCell 415 may then lack the information to configure the UE 105 properly for neighbor cell detection. Thus, SFTD measurement may be used to address this concern. In an SFTD measurement, the UE 105 may measure the timing difference of SFN and frame boundary between the serving cell and neighbor cells being measured and reports it to the PCell 415. A neighbor cell is a cell that has not been established as a serving cell of the UE.

The PCell 415 may configure the UE 105 to perform one or more SFTD measurements with respect to one or more neighbor cells of the UE 105. For the UE 105 to perform SFTD measurements, certain measurement gap or interruption may be needed. The PCell 415 may need proper approaches to configure the UE 105 based on various network conditions and details of the measurement tasks. Various embodiments are discussed as follows to address various scenarios for SFTD measurements.

EN-DC Network

In the EN-DC network 400, the AN 405 may be an eNB and the AN 410 may be a gNB. In accordance, the cells 415/420/425 may be LTE cells and the cells 435/440/445 may be NR cells.

In a first example scenario, the PSCell 435 may be configured as an NR PSCell of the UE 105, and one or more NR SCells of the SCG may be serving cells of the UE 105 in the network. The NR PSCell 435, NR SCell 440, or other NR SCell of the SCG 450 may be configured to transmit its SSB(s) at a monitored carrier frequency for certain measurements of Measurement Object 1 (MO1) associated with an SMTC1 configuration. Meanwhile, a target NR non-serving cell 455 may transmit one or more SSBs for UE to detect or measure a Measurement Object 2 (MO2) with a configured SMTC2. A measurement object may be a to-be-measured cell operating on a certain frequency or a range of frequencies. The carrier frequency of the target cell 455 may be the same as the monitored carrier frequency (or intra-frequency) of the NR PSCell 435, NR SCell 440, or other NR SCell of the SCG 450. There may be a timing drift between the different cells. With or without the timing drift, the SMTC1 and SMTC2 may be overlapped. If the SMTC1 (SMTC window in MO1) and SMTC2 (SMTC window in MO2) are fully overlapped, the UE 105 may use the SMTC1 to perform an SFTD measurement with respect to the NR neighbor cell 455, on a monitored carrier frequency associated with the NR PSCell 435 or an SCG serving cell. Otherwise, the UE 105 may not perform the SFTD measurement.

In a second example scenario, the NR PSCell 435 may be configured as an NR PSCell of the UE 105, and one or more NR SCells of the SCG 450 may be serving cells of the UE 105 in the network. The NR PSCell 435, NR SCell 440, or other NR SCell of the SCG 450 may be configured to transmit its SSB(s) at a monitored carrier frequency for certain measurements. Then the UE 105 may be configured to perform a SFTD measurement on a different frequency than the monitored carrier frequency, with respect to the target NR non-serving cell 455. Such a non-monitored carrier frequency may be referred to as an inter-frequency. If there is a timing drift between the monitored carrier frequency from a serving cell of SCG 450 and the non-monitored carrier frequency from the target NR neighbor cell 455, the LTE PCell 415 may not be able to know or schedule an appropriate measurement gap or SMTC timing for such an inter-frequency measurement with respect to the target NR neighbor cell. Thus, an interruption-based SFTD measurement may be needed, in which the UE 105 may first obtain timing and Master Information Block (MIB) information regarding the NR PSCell 435 or one serving cell of the SCG 450, then tune to the non-monitored carrier frequency used by the target NR neighbor cell 455 to obtain the timing and MIB information regarding the target NR neighbor cell 455.

If the LTE PCell 415, NR PSCell 435, and the target NR neighbor cell 455 are intra-band, in which all of the three cells are operating on the same frequency band, the UE 105 may be allowed with an interruption so that the UE 105 may perform the SFTD measurement. The interruption may be for communications and/or activities with LTE PCell 415 and/or activated NR SCells of SCG 450. The activated NR SCells may be configured during Tmeasure_SFTD1 as specified in 3rd-Generation Partnership Project (3GPP) technical specifications, for example, TS 36.133, v15.2.0 (2018 April), Section 8.1.2.4.25. Such an interruption may be up to 10 subframes. The length of the subframes may be determined by or based on the LTE PCell 415.

If both the LTE PCell 415 and NR PSCell 435 are inter-band with respect to the target NR neighbor cell 455, in which the LTE PCell 415 and NR PSCell 435 are operating on a band that is different from the band of the target NR neighbor cell 455, the UE 105 may be allowed with an interruption so that the UE 105 may perform the SFTD measurement. Similarly, the interruption may be for communications and/or activities with LTE PCell 415 and/or activated NR SCells of SCG 450. The activated NR SCells may be configured during $T_{measure\_SFTD1}$, as specified in, for example, TS 36.133, Section 8.1.2.4.25. An example $T_{measure\_SFTD1}$ definition is listed as follows:

When no MCG DRX is used, the UE shall be capable of determining SFTD within a physical layer measurement period of $T_{measure\_SFTD1}$ as follows:

For SFTD measurements without measurement gaps, and without additional RSRP reporting:

For NR carrier in FR1: $T_{measure\_SFTD1}$=[14] SMTC periods

For NR carrier in FR2: $T_{measure\_SFTD1}$=[$N_1$×14] SMTC periods

For SFTD measurements in measurement gaps, and without additional RSRP reporting:

For NR carrier in FR1: $T_{measure\_SFTD1}$=[$N_{freq}$×8×max (MGRP, SMTC period)]

For NR carrier in FR2: $T_{measure\_SFTD1}$=[$N_{freq}$×$N_1$×8×max (MGRP, SMTC period)]

For SFTD measurements without measurement gaps, and with additional RSRP reporting:

For NR carrier in FR1: $T_{measure\_SFTD1}$=[19] SMTC periods

For NR carrier in FR2: $T_{measure\_SFTD1}$=[$N_1$×19] SMTC periods

For SFTD measurements in measurement gaps, and with additional RSRP reporting:

For NR carrier in FR1: $T_{measure\_SFTD1}$=[$N_{freq}$×13×max (MGRP, SMTC period)]

For NR carrier in FR2: $T_{measure\_SFTD1}$=[$N_{freq}$×$N_1$×13× max(MGRP, SMTC period)]

where $N_{freq}$ is the number of carriers monitored in measurement gaps.

Editor's note: The value of N1 is FFS

When MCG DRX is used, the same $T_{measure\_SFTD1}$ as for non-DRX applies, but the reporting delay depends on the DRX cycle length in use.

NE-DC Network

Figure 4B:
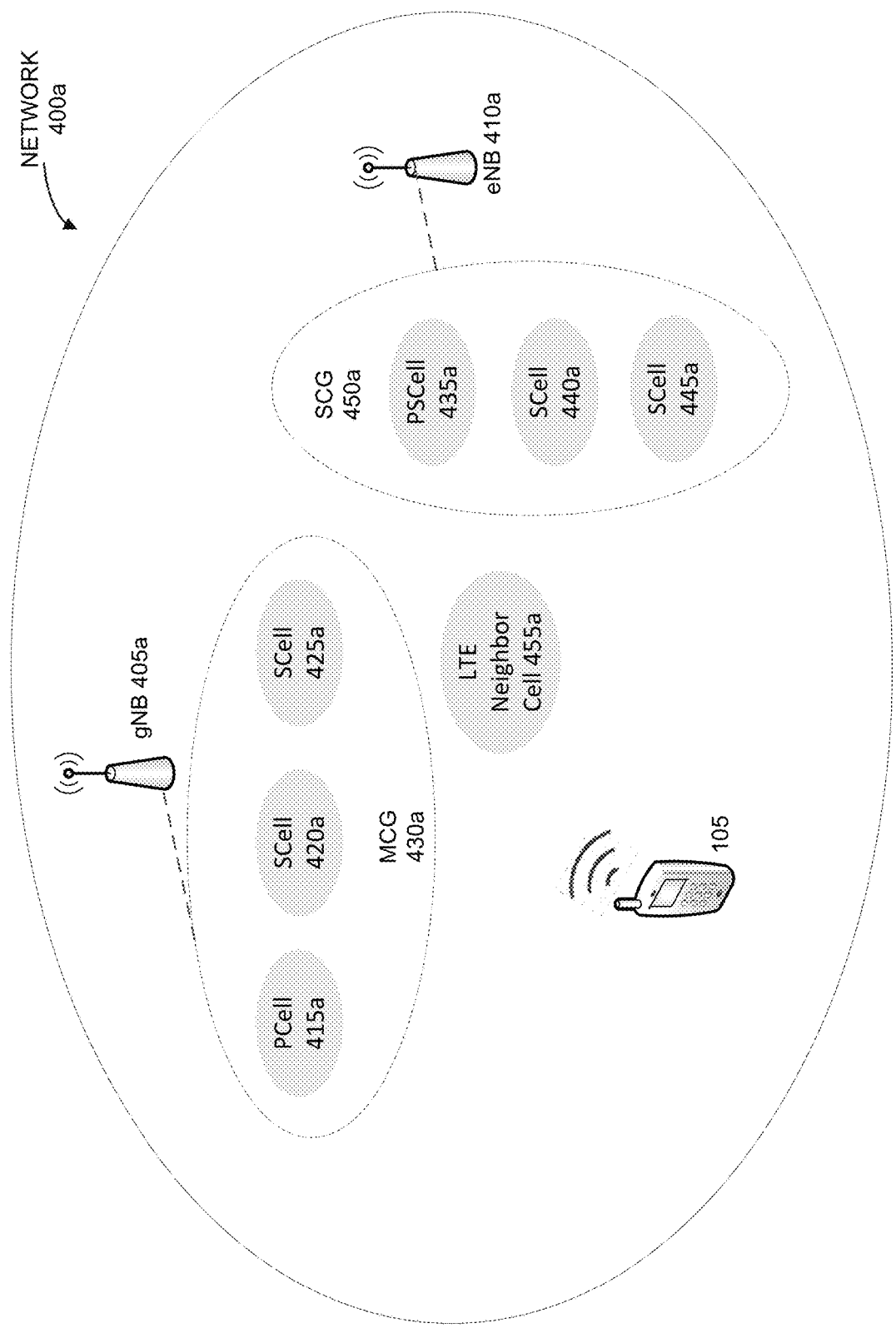

In an NE-DC network 400a as schematically illustrated in FIG. 4B, the AN 405a may be a gNB and the AN 410a may be an eNB. In accordance, the cells 415a/420a/425a may be NR cells and the cells 435a/440a/445a may be LTE cells.

In a first example scenario, if the UE 105 is to perform the SFTD measurement prior to the LTE PSCell 435a may be configured, the UE 105 may use an LTE measurement gap to perform the SFTD measurement regarding an target LTE neighbor cell 455a, since a LTE reference signal or synchronization signal may be transmitted every 5 milliseconds (ms). For example, if the LTE PSCell 435a is not configured, the UE 105 may use a measurement gap of 6 ms to perform the SFTD measurement between an NR PCell 415a and the target LTE neighbor cell 455a.

In a second example scenario, if the LTE PSCell 435a has been configured, the SFTD measurement requirement may be determined as follows:

When no Discontinuous Reception (DRX) may be used in either NR PCell 415a or LTE PSCell 435a. A physical layer measurement period of the SFTD measurement may be $T_{measure\_SFTD1}$=max (200, 5×SMTC period) ms. In this way, a maximum 200 ms may be allocated for the SFTD measurement.

When DRX may be used in either NR PCell 415a or LTE PSCell 435a, or both, the physical layer measurement period of the SFTD measurement may be as specified as in Table 1 below:

TABLE 1

| DRX cycle length (s) | $T_{measure\ SFTD1}$ (s) (DRX cycles) |
|---|---|
| ≤0.04 | max(0.2, 5 × SMTC period)](Note1) |
| ≥0.04 | Note2 |

Note 1:
Number of DRX cycles depends upon the DRX cycle in use
Note2:
Time depends upon the DRX cycle in use
Note3:
DRX cycle length in this table refers to the DRX cycle length configured for PCell or PSCell. When DRX is used in both PCell and PSCell, DRX cycle length in this table refers to the longer of the DRX cycle lengths for PCell and PSCell.

Figures 5A, 5B:
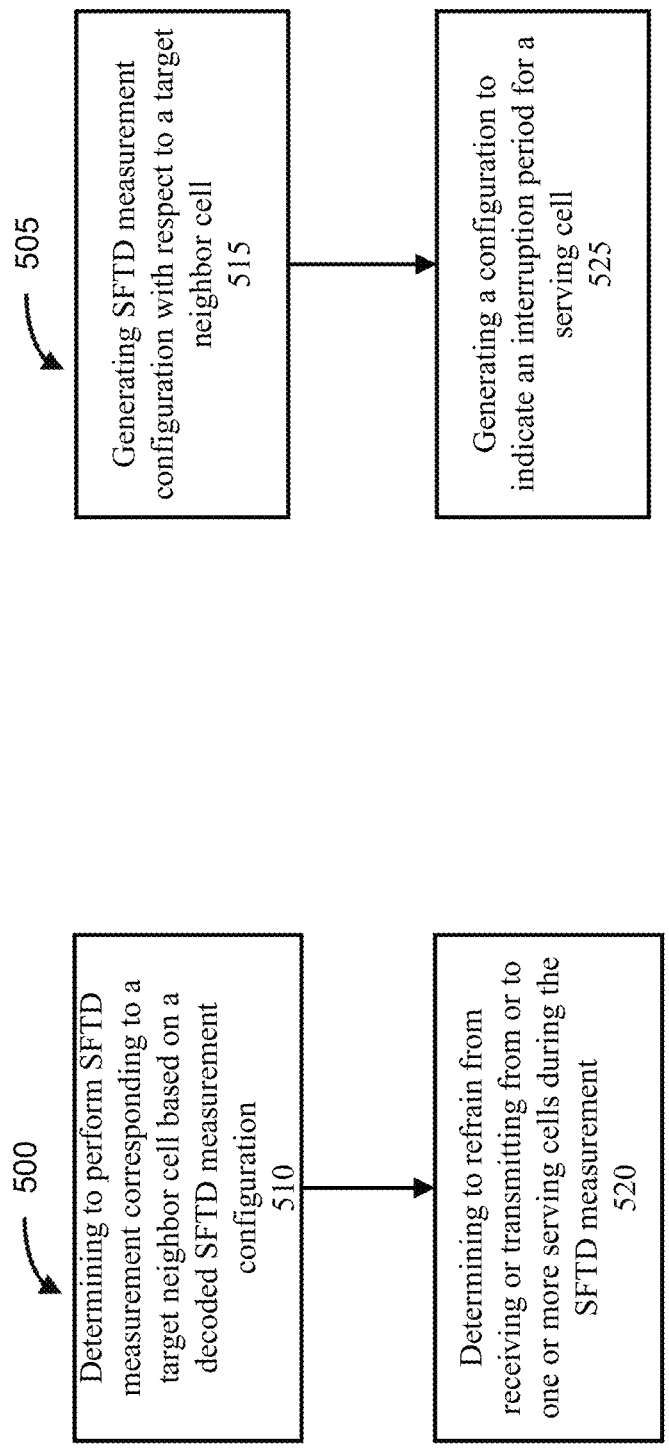
FIG. 5A illustrates an operation flow/algorithmic structure to facilitate a process of SFTD measurement configuration by a UE in accordance with some embodiments.
FIG. 5B illustrates an operation flow/algorithmic structure to facilitate the process of SFTD measurement configuration by an AN in accordance with some embodiments.

FIG. 5A illustrates an operation flow/algorithmic structure 500 to facilitate a process of SFTD measurement configuration and operation by the UE 105, in accordance with some embodiments as illustrated with respect to FIGS. 4A and 4B. The operation flow/algorithmic structure 500 may be performed by the UE 105 or circuitry thereof.

The operation flow/algorithmic structure 500 may include, at 510, performing an SFTD measurement corresponding to a target neighbor cell, based on a decoded SFTD measurement configuration. The target neighbor cell may be an NR neighbor cell in an EN-DC network, or a LTE neighbor cell in an NE-DC network. The UE may decode the SFTD configuration upon reception of a corresponding signal transmitted by an eNB in the EN-DC network, or a gNB in the NE-DC network.

The operation flow/algorithmic structure 500 may include, at 520, refraining from receiving from or transmitting to one or more serving cells in a network during the SFTD measurement. Once the UE performs the SFTD measurement, the UE may determine to refrain from other communication activities with serving cells in the network. Those communication activities may include data transmissions between the UE and serving cells and non-data activities, including but not limited to cell/beam detections, measurements, and other control-channel activities.

FIG. 5B illustrates an operation flow/algorithmic structure 505 to facilitate the process of SFTD measurement configuration and operation by the AN 405 operating in the EN-DC network or the AN 405a in the NE-DC network, in accordance with some embodiments, as illustrated with respect to FIGS. 4A and 4B. The AN 405 may be an eNB in the EN-DC network and the AN 405a in the NE-DC network. The operation flow/algorithmic structure 505 may be performed by the AN 110 or circuitry thereof.

The operation flow/algorithmic structure 505 may include, at 515, generating an SFTD measurement configuration with respect to a target neighbor cell. In the EN-DC network, the target neighbor cell may be a target NR neighbor cell. Further, there may be already a PCell and a PSCell of the UE in the network. Thus, a third cell may be monitored and/or measured by the UE. In the NE-DC network, the target neighbor cell may be a target LTE neighbor cell. There may be a PCell of the UE in the network and the PSCell may not have been established. Or there may be a PCell and PSCell of the UE 105 in the network.

The operation flow/algorithmic structure 505 may further include, at 525, generating a configuration to indicate an interruption period for a serving cell of the UE. The serving cell may be the PCell of the UE, or the PSCell of the UE if established, or one of other SCells of the UE. The interruption may be configured so that the serving cell would not expect data or non-data transmissions or communications with the UE 105.

Figure 6:
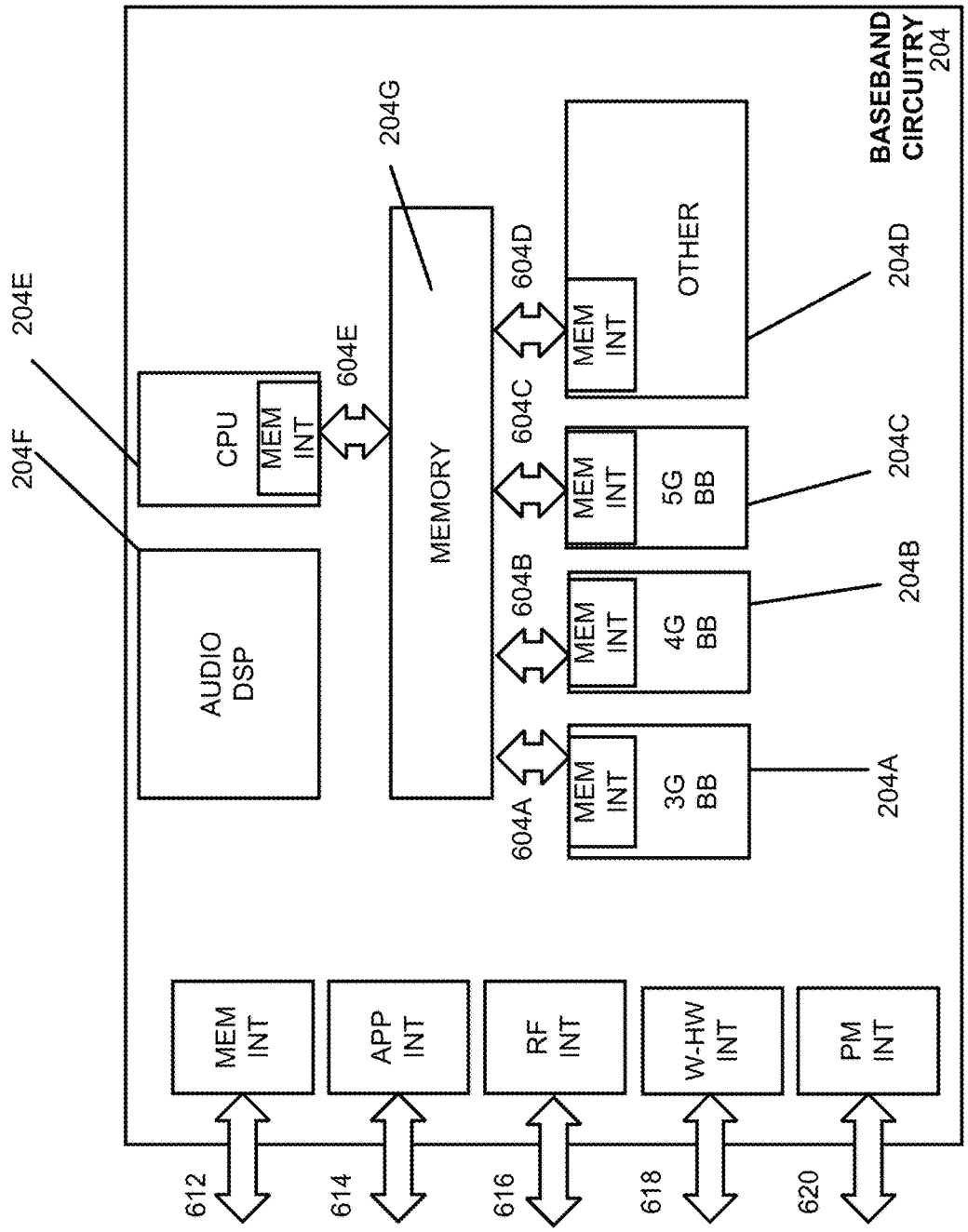
FIG. 6 illustrates example interfaces of baseband circuitry in accordance with various embodiments.

FIG. 6 illustrates example interfaces of baseband circuitry in accordance with some embodiments. As discussed above, the baseband circuitry 204 of FIG. 2 may comprise processors 204A-204E and a memory 204G utilized by said processors. The processors 204A-204E of the UE 105 may perform some or all of the operation flow/algorithmic structure 500, in accordance with various embodiments with respect to the networks 400 and 405. The processors 204A-204E of the AN 110 may perform some or all of the operation flow/algorithmic structure 505, in accordance with various embodiments with respect to the networks 400 and 405. Each of the processors 204A-204E may include a memory interface, 604A-604E, respectively, to send/receive data to/from the memory 204G. The processors 204A-204E of the UE 105 may be used to process the SFTD measurement; the processors 204A-204E of the AN 110 may be used to generate the SFTD measurement configuration.

The baseband circuitry 204 may further include one or more interfaces to communicatively couple to other circuitries/devices, such as a memory interface 612 (e.g., an interface to send/receive data to/from memory external to the baseband circuitry 204), an application circuitry interface 614 (for example, an interface to send/receive data to/from the application circuitry 202 of FIG. 2), an RF circuitry interface 616 (for example, an interface to send/receive data to/from RF circuitry 206 of FIG. 2), a wireless hardware connectivity interface 618 (for example, an interface to send/receive data to/from Near Field Communication (NFC) components, Bluetooth® components (for example, Bluetooth® Low Energy), Wi-Fi® components, and other communication components), and a power management interface 620 (for example, an interface to send/receive power or control signals).

Figure 7:
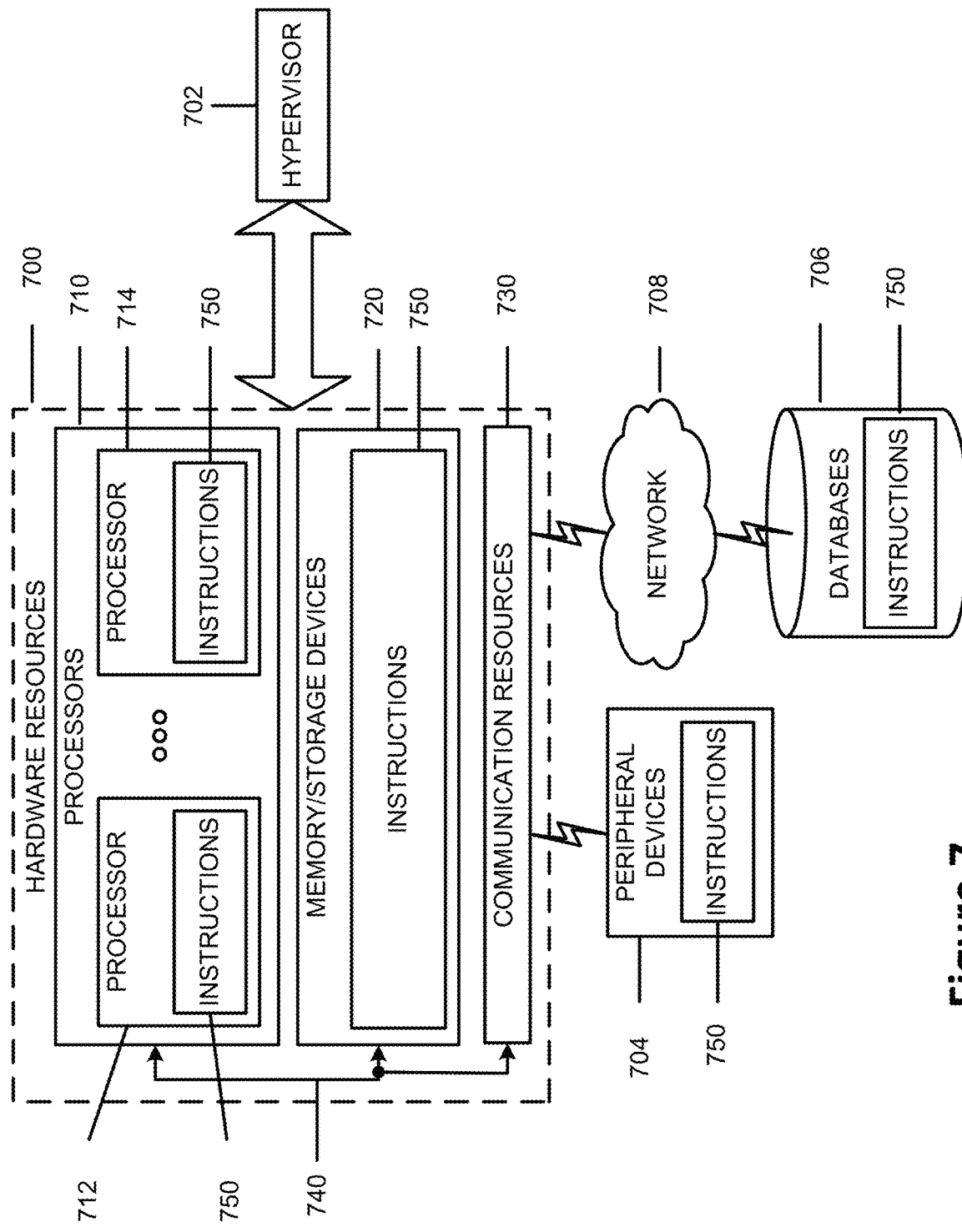
FIG. 7 illustrates hardware resources in accordance with various embodiments.

FIG. 7 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (for example, network function virtualization (NFV)) is utilized, a hypervisor 702 may be executed to provide an execution environment for one or more network slices/sub-slices to utilize the hardware resources 700.

The processors 710 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (for example, for coupling via a Universal Serial Bus (USB)), cellular communication components, NFC components, Bluetooth® components (for example, Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein, e.g., the operation flows 500 and 505. For example, in an embodiment in which the hardware resources 700 are implemented into the UE 105, the instructions 750 may cause the UE to perform some or all of the operation flow/algorithmic structure 500. In other embodiments, the hardware resources 700 may be implemented into the AN 110. The instructions 750 may cause the AN 110 to perform some or all of the operation flow/algorithmic structure 505. The instructions 750 may reside, completely or partially, within at least one of the processors 710 (for example, within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 may include one or more non-transitory computer-readable media (NTCRM) comprising instructions to, upon execution of the instructions by one or more processors of a UE, cause the UE to perform a System frame number (SFN) and Frame Timing Difference (SFTD) measurement corresponding to a target neighbor cell, based on a decoded SFTD measurement configuration from a first serving cell of the UE; and refrain from receiving or transmitting from or to a first serving cell.

Example 2 may include the one or more NTCRM of example 1 and/or some other example herein, wherein to refrain from receiving or transmitting from or to a first serving cell is further to refrain from receiving or transmitting from or to a second serving cell in the network during the SFTD measurement.

Example 3 may include the one or more NTCRM of example 2 and/or some other example herein, wherein the first serving cell is a Long Term Evolution (LTE) Primary Cell (PCell), the second serving cell is a New Radio (NR) Primary Secondary Cell (PSCell), and the target neighbor cell is a target NR neighbor cell, further wherein the target NR neighbor cell, the LTE PCell, and the NR PSCell operate on a monitored carrier frequency.

Example 4 may include the one or more NTCRM of example 3 and/or some other example herein, wherein a first SMTC window regarding a first measurement object is associated with the NR PSCell, a second SMTC window regarding a second measurement object is associated with the target NR neighbor cell, and the first SMTC window is fully overlapped with the second SMTC window.

Example 5 may include the one or more NTCRM of example 2 and/or some other example herein, wherein the first serving cell is a Long Term Evolution (LTE) Primary Cell (PCell), the second serving cell is a New Radio (NR) serving cell of a Secondary Cell Group (SCG), and the target neighbor cell is an NR target neighbor cell, further wherein the target NR neighbor cell, the LTE PCell, and the NR serving cell operate on a monitored carrier frequency.

Example 6 may include the one or more NTCRM of example 4 and/or some other example herein, wherein a first SMTC window regarding a first measurement object is associated with the NR serving cell, a second SMTC window regarding a second measurement object is associated with the target NR neighbor cell, and the first SMTC window is fully overlapped with the second SMTC window.

Example 7 may include the one or more NTCRM of example 2 and/or some other example herein, wherein the first serving cell is a Long Term Evolution (LTE) Primary Cell (PCell), the second serving cell is a New Radio (NR) Primary Secondary Cell (PSCell), and the target neighbor cell is an NR target neighbor cell.

Example 7.5 may include the one or more NTCRM of example 7 and/or some other example herein, wherein the instructions, upon execution, further cause the UE to obtain timing information and Master Information Block (MIB) information from the NR PSCell; and obtain timing information and Master Information Block (MIB) information from the target NR neighbor cell.

Example 8 may include the one or more NTCRM of example 7 and/or some other example herein, wherein the instruction, upon executions, further cause the UE to refrain from receiving from or transmitting to the first serving cell and the second serving cell is within a number of subframes.

Example 9 may include the one or more NTCRM of example 8 and/or some other example herein, wherein further wherein the target NR neighbor cell, the LTE PCell, and the NR PSCell operate on one or more intra-band frequencies from a band; and the number of subframes is ten.

Example 10 may include the one or more NTCRM of example 7 and/or some other example herein, wherein the target NR neighbor cell corresponds to an operation of a first band, the LTE PCell corresponds to an operation of a second band, and the NR PSCell corresponds to an operation of a third band, further wherein the first band is different from the second band and the third band.

Example 11 may include the one or more NTCRM of example 1 and/or some other example herein, wherein the network includes one or more activated Secondary Cells (SCells) associated with a next-generation NodeB (gNB).

Example 12 may include the one or more NTCRM of examples 1 and 2 and/or some other example herein, wherein the decoded SFTD measurement configuration is transmitted by an evolved NodeB (eNB) and the network is an Evolved-Universal Terrestrial Radio Access—NR Dual Connectivity (EN-DC) network.

Example 13 may include the one or more NTCRM of example 1 and/or some other example herein, wherein the first serving cell is a New Radio (NR) Primary serving Cell (PCell), the second serving cell is a Long Term Evolution (LTE) Primary Secondary Cell (PSCell), and the target neighbor cell is an LTE target neighbor cell.

Example 14 may include the one or more NTCRM of example 13 and/or some other example herein, wherein the decoded SFTD measurement configuration is transmitted by a next-generation NodeB (gNB) and the network is an NR-Evolved-Universal Terrestrial Radio Access Dual Connectivity (NE-DC) network.

Example 15 may include the one or more NTCRM of example 13 and/or some other example herein, wherein the instructions, upon execution, further cause the UE to determine a measurement period for performing the SFTD measurement.

Example 16 may include the one or more NTCRM of example 14 and/or some other example herein, wherein to determine the measurement period is to determine the measurement period based on an LTE measurement gap if no Long Term Evolution (LTE) Primary Secondary Cell (PSCell) is configured in the NE-DC network.

Example 17 may include the one or more NTCRM of example 16 and/or some other example herein, wherein the LTE measurement gap is 6 milliseconds.

Example 18 may include the one or more NTCRM of example 15 and/or some other example herein, wherein to determine the measurement period is to determine the measurement period to be maximum value between 200 milliseconds and a multiplication of 5 times Synchronization signal block-based Measurement Timing configuration (SMTC) period, wherein a Discontinuous Reception (DRX) is not used in either a Primary serving Cell (PCell) or a Primary Secondary Cell (PSCell).

Example 19 may include one or more non-transitory computer-readable media (NTCRM) comprising instructions to, upon execution of the instructions by one or more processors of an Access Node (AN), cause the AN to: generate a System frame number (SFN) and Frame Timing Difference (SFTD) measurement configuration to configure a User Equipment (UE) to perform an SFTD measurement with respect to a target neighbor cell; and generate a configuration to indicate an interruption period for a first serving cell of the UE.

Example 20 may include the one or more NTCRM of example 19 and/or some other example herein, wherein the AN is an evolved NodeB (eNB), the first serving cell is a Long Term Evolution (LTE) Primary serving Cell (PCell), and the target neighbor cell is a New Radio (NR) target neighbor cell.

Example 21 may include the one or more NTCRM of example 20 and/or some other example herein, wherein the AN is a next-generation NodeB (gNB), and the configuration is to indicate a measurement gap for the SFTD measurement, prior to a Long Term Evolution (LTE) Primary Secondary Cell (PSCell) is configured.

Example 22 may include the one or more NTCRM of example 21 and/or some other example herein, wherein the measurement gap is 6 milliseconds.

Example 23 may include the one or more NTCRM of example 20 and/or some other example herein, wherein the AN is a next-generation NodeB (gNB), and upon execution, the instructions further cause the gNB to determine an SFTD measurement period for performing the SFTD measurement.

Example 24 may include the one or more NTCRM of example 23 and/or some other example herein, wherein the SFTD measurement period is a maximum value between 200 milliseconds and a multiplication of 5 times Synchronization signal block-based Measurement Timing configuration (SMTC) period, wherein a Discontinuous Reception (DRX) is not used in either a Primary Cell (PCell) or a Primary Secondary Cell (PSCell).

Example 25 may include the one or more NTCRM of example 23 and/or some other example herein, wherein the SFTD measurement period is based, at least in part, on a Discontinuous Reception (DRX) cycle length, wherein the DRX is used in either a Primary Cell (PCell) or a Primary Secondary Cell (PSCell).

Example 26 may include the one or more NTCRM of example 25 and/or some other example herein, wherein the SFTD measurement period is based, at least in part, on the DRX cycle length according to the relationship of Table 1.

Example 27 may include the one or more NTCRM of example 19 and/or some other example herein, wherein the instructions, upon execution, further cause the AN to transmit the SFTD measurement configuration to the UE; and transmit the configuration to indicate the interruption period or a measurement gap to the first serving cell and second serving cell respectively upon transmitting the SFTD measurement configuration to the UE.

Example 28 may include an apparatus comprising means to perform one or more elements of a method or NTCRM described in or related to any of examples 1-27, or any other method or process described herein.

Example 29 may include one or more non-transitory computer-readable media comprising instructions to cause an electronic device, upon execution of the instructions by one or more processors of the electronic device, to perform one or more elements of a method or NTCRM described in or related to any of examples 1-27, or any other method or process described herein.

Example 30 may include an apparatus comprising logic, modules, and/or circuitry to perform one or more elements of a method or NTCRM described in or related to any of examples 1-27, or any other method or process described herein.

Example 31 may include a method, technique, or process as described in or related to any of examples 1-27, or portions or parts thereof.

Example 32 may include an apparatus comprising: one or more processors and one or more computer-readable media comprising instructions that, when executed by the one or more processors, cause the one or more processors to perform the method, techniques, or process as described in or related to any of examples 1-27, or portions thereof, or otherwise described in the present disclosure. The one or more computer-readable media may be one transitory or non-transitory computer-readable media.

Example 33 includes at least one transitory or non-transitory computer-readable storage medium comprising data, wherein the data is to create, manufacture, or otherwise produce instructions, wherein execution of the instructions is to cause a computing device or computing system to perform the method, techniques, or process as described in or related to any of examples 1-27, or portions thereof, or otherwise described in the present disclosure.

Example 34 includes a signal as described in or related to any of examples 1-27, or portions or parts thereof, or otherwise described in the present disclosure.

Example 35 includes a signal in a wireless network as shown and described in the present disclosure, or otherwise described in the present disclosure.

Example 36 includes a method of communicating in a wireless network as shown and described in the present disclosure.

Example 37 includes a system for providing wireless communication as shown and described in the present disclosure.

Example 38 includes a device for providing wireless communication as shown and described in the present disclosure.

Example 39 includes a packet, frame, segment, protocol data unit (PDU), or message as described in or related to any of examples 1-27, or portions or parts thereof, or otherwise described in the present disclosure.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. One or more non-transitory computer-readable media (NTCRM) comprising instructions to, upon execution of the instructions by one or more processors of a user equipment (UE), cause the UE to:
   determine a period for a System frame number (SFN) and Frame Timing Difference (SFTD) measurement based on an SFTD measurement configuration received from a first serving cell of the UE;
   perform the SFTD measurement corresponding to a target neighbor cell, based on the SFTD measurement configuration during the period, wherein the period is determined at least based on a frequency of a second serving cell; and
   refrain from receiving from or transmitting to the first serving cell and the second serving cell in a network during the period,
   wherein the SFTD measurement measures a time difference of an SFN and a frame boundary between the first serving cell and the target neighbor cell, and wherein the second serving cell is different from the target neighbor cell.

2. The one or more NTCRM of claim 1, wherein the first serving cell is a Long Term Evolution (LTE) Primary Cell (PCell), the second serving cell is a New Radio (NR) Primary Secondary Cell (PSCell), and the target neighbor cell is a target NR neighbor cell.

3. The one or more NTCRM of claim 2, wherein the instructions, upon execution, further cause the UE to refrain from receiving from or transmitting to the first serving cell and the second serving cell for a number of subframes.

4. The one or more NTCRM of claim 3, wherein:
   the target NR neighbor cell, the LTE PCell, and the NR PSCell operate on intra-band frequencies; and
   the number of subframes is ten.

5. The one or more NTCRM of claim 2, wherein to perform the SFTD measurement corresponding to the target neighbor cell, the instructions, upon execution, cause the UE to:
   obtain timing information and Master Information Block (MIB) information from the NR PSCell; and
   obtain timing information and MIB information from the target NR neighbor cell.

6. The one or more NTCRM of claim 2, wherein the target NR neighbor cell is to operate in a first band, the LTE PCell is to operate in a second band, and the NR PSCell is to operate in a third band, further wherein the first band is different from the second band and the third band.

7. The one or more NTCRM of claim 6, wherein the network includes one or more activated Secondary Cells (SCells) associated with the NR PSCell.

8. The one or more NTCRM of claim 1, wherein the SFTD measurement configuration is transmitted by an evolved NodeB (eNB) and the network is an Evolved-universal terrestrial radio access—New radio Dual Connectivity (EN-DC) network.

9. The one or more NTCRM of claim 1, wherein the first serving cell is a New Radio (NR) Primary serving Cell (PCell), the second serving cell is a Long Term Evolution (LTE) Primary Secondary Cell (PSCell), and the target neighbor cell is an LTE target neighbor cell.

10. The one or more NTCRM of claim 9, wherein the SFTD measurement configuration is transmitted by a next-generation NodeB (gNB) and the network is a New radio-Evolved-universal terrestrial radio access Dual Connectivity (NE-DC) network.

11. One or more non-transitory computer-readable media (NTCRM) comprising instructions to, upon execution of the instructions by one or more processors of an Access Node (AN), cause the AN to:
   generate a System frame number (SFN) and Frame Timing Difference (SFTD) measurement configuration to configure a User Equipment (UE) to perform an SFTD measurement with respect to a target New Radio (NR) neighbor cell; and
   generate a configuration to indicate an interruption period for a first serving cell of the UE based at least on a frequency of a second serving cell,
   wherein the SFTD measurement measures a time difference of an SFN and a frame boundary between the first serving cell and the target NR neighbor cell, and
   wherein the second serving cell is different from the target NR neighbor cell.

12. The one or more NTCRM of claim 11, wherein the AN is an evolved NodeB (eNB), and the first serving cell is a Long Term Evolution (LTE) Primary serving Cell (PCell).

13. The one or more NTCRM of claim 11, wherein the AN is a next-generation NodeB (gNB), and the configuration is to indicate a measurement gap for the SFTD measurement, prior to the second serving cell being configured, wherein the second serving cell is a Long Term Evolution (LTE) Primary Secondary Cell (PSCell).

14. The one or more NTCRM of claim 13, wherein the measurement gap is of 6 milliseconds.

15. The one or more NTCRM of claim 11, wherein the AN is a next-generation NodeB (gNB), and upon execution, the instructions further cause the gNB to determine an SFTD measurement period for performing the SFTD measurement.

16. The one or more NTCRM of claim 15, wherein the SFTD measurement period is a maximum value between 200 milliseconds and a multiplication of 5 times Synchronization signal block-based Measurement Timing configuration (SMTC) period, wherein a Discontinuous Reception (DRX) is not used in either a Primary Cell (PCell) or a Primary Secondary Cell (PSCell).

17. The one or more NTCRM of claim 15, wherein the SFTD measurement period is based, at least in part, on a Discontinuous Reception (DRX) cycle length, wherein the DRX cycle length is used in either a Primary Cell (PCell) or a Primary Secondary Cell (PSCell).

18. The one or more NTCRM of claim 11, further comprising:
    transmit the SFTD measurement configuration to the UE; and
    transmit the configuration to indicate the interruption period or a measurement gap to the first serving cell and second serving cell respectively upon transmitting the SFTD measurement configuration to the UE.

19. A user equipment (UE) associated with a first serving cell and a second serving cell, comprising:
    one or more baseband processors to process a System frame number (SFN) and Frame Timing Difference (SFTD) measurement configuration with respect to a target Long Term Evolution (LTE) neighbor cell in a New radio - Evolved-universal terrestrial radio access Dual Connectivity (NE-DC) network; and
    a central processing unit (CPU) coupled with the one or more baseband processors, the CPU to:
        perform, based on the SFTD measurement configuration, an SFTD measurement with respect to the target LTE neighbor cell; and
        determine a measurement period for performing the SFTD measurement based at least on a frequency of the second serving cell,
        wherein the SFTD measurement measures a time difference of an SFN and a frame boundary, and
        wherein the second serving cell is different from the target LTE neighbor cell.

20. The UE of claim 19, wherein to determine the measurement period, the CPU is to determine the measurement period based on an LTE measurement gap if the second serving cell is not configured in the NE-DC network, wherein the second serving cell is a Long Term Evolution (LTE) Primary Secondary Cell (PSCell).

21. The UE of claim 19, wherein to determine the measurement period, the CPU is to determine the measurement period to be a maximum value between 200 milliseconds and a multiplication of 5 times Synchronization signal block-based Measurement Timing configuration (SMTC) period, wherein a Discontinuous Reception (DRX) is not used in either the first serving cell or the second serving cell, wherein the first serving cell is a Primary serving Cell (PCell) and the second serving cell is a Primary Secondary Cell (PSCell).

22. An apparatus of an evolved NodeB (eNB), comprising:
    means for generating a System frame number (SFN) and Frame Timing Difference (SFTD) measurement configuration with respect to a target New Radio (NR) neighbor cell of a User Equipment (UE) in an Evolved-universal terrestrial radio access-New Radio (NR) Dual Connectivity (EN-DC) network;
    means for generating a message to indicate an interruption period for an NR Primary Secondary Cell (PSCell) to refrain signal transmission from or to the NR PSCell of the UE based at least on a frequency of the NR PSCell; and
    means for transmitting the SFTD measurement configuration to the UE,
    wherein the SFTD measurement configuration configures the UE to measures a time difference of an SFN and a frame boundary between the NR PSCell and the target NR neighbor cell, and
    wherein the NR PSCell is different from the target NR neighbor cell.

23. The apparatus of claim 22, wherein the eNB, the NR PSCell, and the target NR neighbor cell operate on intra-band frequencies.

* * * * *